(12) United States Patent
Aten et al.

(10) Patent No.: US 9,945,150 B2
(45) Date of Patent: Apr. 17, 2018

(54) HIGH VISIBILITY LATCH HANDLE

(71) Applicant: Rohr, Inc., Chula Vista, CA (US)

(72) Inventors: Michael Aten, San Diego, CA (US);
Kristian Sitson, San Diego, CA (US);
John J. Lee, Thousand Oaks, CA (US);
Yibin Deng, Alhambra, CA (US)

(73) Assignee: Rohr, Inc., Chula Vista, CA (US)

( * ) Notice: Subject to any disclaimer, the term of this patent is extended or adjusted under 35 U.S.C. 154(b) by 405 days.

(21) Appl. No.: 14/671,286

(22) Filed: Mar. 27, 2015

(65) Prior Publication Data

US 2016/0280384 A1 Sep. 29, 2016

(51) Int. Cl.
*E05B 1/00* (2006.01)
*F01D 25/24* (2006.01)
*B64D 29/06* (2006.01)

(52) U.S. Cl.
CPC ............... *E05B 1/00* (2013.01); *B64D 29/06* (2013.01); *F01D 25/24* (2013.01); *F05B 2240/14* (2013.01); *F05B 2250/141* (2013.01); *F05D 2240/14* (2013.01); *F05D 2250/141* (2013.01)

(58) Field of Classification Search
CPC .......... E05B 1/00; E05B 1/0084; E05B 41/00; F01D 25/24; F05B 2240/14; F05B 2250/141; F05D 2240/14; F05D 2250/141; B64D 29/06; B64D 45/0005
See application file for complete search history.

(56) References Cited

U.S. PATENT DOCUMENTS

| | | | | |
|---|---|---|---|---|
| 2,783,072 A * | 2/1957 | Sessler | ................ | E05C 19/145 |
| | | | | 292/256 |
| 3,515,422 A * | 6/1970 | Poe | ........................ | E05C 3/122 |
| | | | | 292/108 |
| 6,343,815 B1* | 2/2002 | Poe | ....................... | E05C 19/145 |
| | | | | 292/113 |
| 6,629,712 B2* | 10/2003 | Jackson | ................. | B64D 29/02 |
| | | | | 244/129.4 |
| 6,824,175 B2* | 11/2004 | Porte | ..................... | B64D 29/06 |
| | | | | 244/129.4 |
| 7,752,877 B2* | 7/2010 | Burns | ....................... | E05B 5/00 |
| | | | | 292/336.3 |
| 8,807,604 B2* | 8/2014 | Do | ......................... | E05B 41/00 |
| | | | | 292/139 |
| 2012/0235425 A1* | 9/2012 | Do | ......................... | E05C 1/065 |
| | | | | 292/150 |
| 2016/0347465 A1* | 12/2016 | Mellor | ................... | B64D 29/06 |

* cited by examiner

*Primary Examiner* — Woody Lee, Jr.
*Assistant Examiner* — Adam W Brown
(74) *Attorney, Agent, or Firm* — Snell & Wilmer L.L.P.

(57) ABSTRACT

A latch handle is disclosed. The latch handle may comprise a first portion and a second portion. The first portion may comprise a high aspect ratio. The second portion may have a width greater than the second portion.

A nacelle is disclosed. The nacelle may comprise a first panel and a latch assembly. The latch assembly may include a latch housing and a latch handle. The latch handle may include a first portion and a second portion. The first portion may comprise an aspect ratio greater than one. The second portion may have a width greater than the width of the first portion. A cut-out configured to accommodate the latch assembly may be disposed on the first panel. The first panel may be a fan cowl panel.

17 Claims, 6 Drawing Sheets

HIGH VISIBILITY LATCH HANDLE

FIELD

The present disclosure relates to latch handles capable of being used in an aircraft.

BACKGROUND

Latch handles are commonly used in the nacelle of an aircraft, for example, in fan cowls. Fan cowls are hinged to the pylon or to a frame structure attached at the top of the nacelle. Fan cowls enclose the engine fan case and are typically latched with a minimum of three latches at the bottom of the nacelle. Latch handles secure the fan cowl during flight. If left unlatched, fan cowls may depart the aircraft during flight.

SUMMARY

According to various embodiments, a latch handle is disclosed. The latch handle may comprise a first portion and a second portion. The first portion may comprise a high aspect ratio. The second portion may have a width greater than the first portion.

According to various embodiments, a nacelle is disclosed. The nacelle may comprise a fan cowl and a latch assembly. The latch assembly may include a latch housing and a latch handle. The latch handle may include a first portion and a second portion. The first portion may comprise an aspect ratio greater than one. The second portion may have a width greater than the width of the first portion. A cut-out may be disposed on the fan cowl, wherein the cut-out is configured to accommodate the latch assembly

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, "aft" refers to the direction associated with the tail (e.g., the back end) of an aircraft, or generally, to the direction of exhaust of the aircraft engine. As used herein, "forward" refers to the direction associated with the nose (e.g., the front end) of an aircraft, or generally, to the direction of flight or motion.

As used herein, "outward" may define an element or portion of an element that is situated radially outer to or away from another, radially inward, element or portion of an element. Thus, an engine core may be situated radially inward of a fan casing, as described herein. As used herein, "inward" may define the element or portion of the element that is situated radially inward in relation to an outward element.

Aircraft fan cowls are often held together with latch assemblies along various axial distances along the fan case. Fan cases may be encased by two fan cowls, which may be joined together with a latch mechanism (e.g., at the bottom of the fan cowls). For example, a fan cowl may include a latch assembly at the bottom of the fan cowl to allow the fan cowl to be hinged open to facilitate access to various fan case components.

It is important that latches be in the closed position prior to take off. If latches are left open, it may result in fan cowl departure during flight. In that regard, it may be advantageous for a latch handle to be highly visible when in the open position.

Accordingly, latch handles may be provided to increase the visibility of the latch handles when the latch handles are in the open position. According to various embodiments, by increasing the size of the latch handles, it may be more apparent to ground crews when the latch handles are in the open position, decreasing the chance of a latch handle entering flight in an open position.

Figure 1:
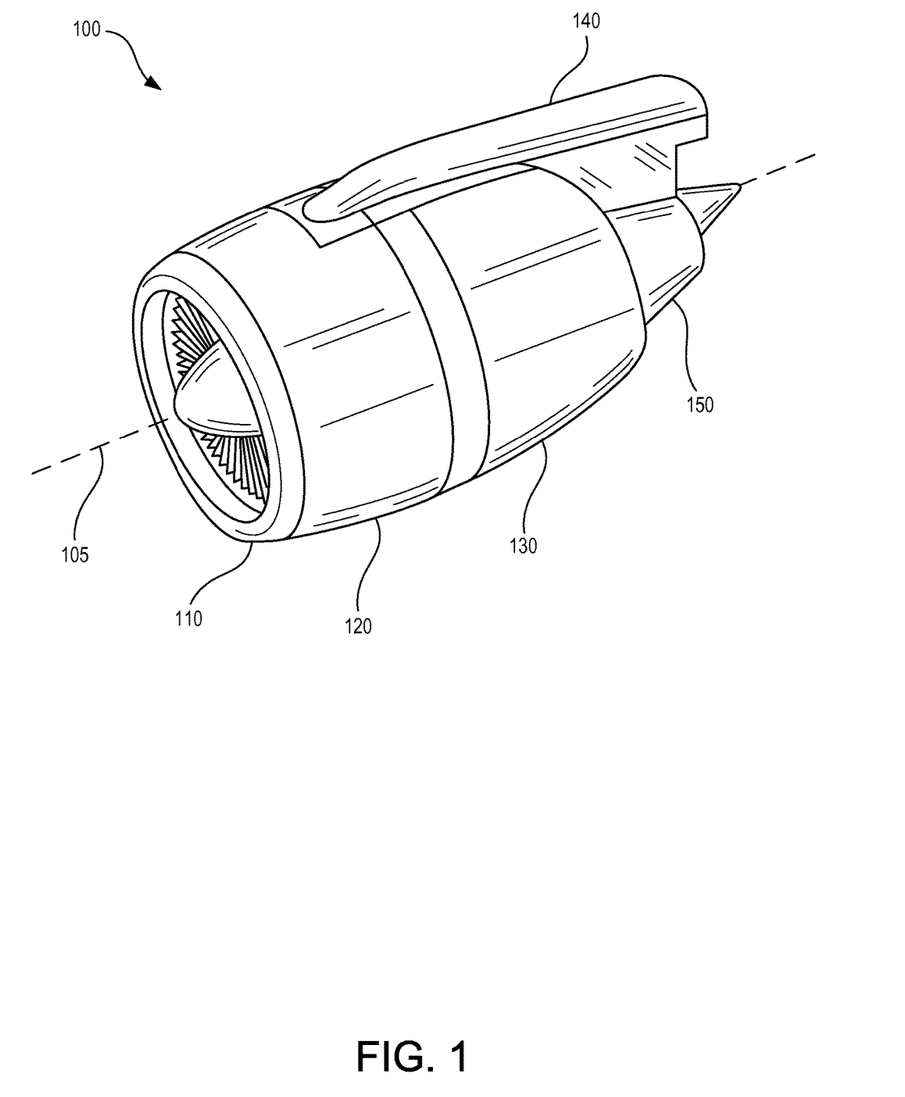
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Nacelle 100 may further comprise an exhaust nozzle 150. Nacelle 100 surrounds the engine providing smooth aerodynamic surfaces for airflow around and into the engine. Fan cowl 120 typically comprises two halves. One half may be referred to as a first fan cowl and the other half may be referred to as a second fan cowl. The first fan cowl and second fan cowl are typically hinged to the pylon or to a frame structure attached at the top of nacelle 100. The nacelle 100 may be disposed about a centerline 105, which may also be the axis of rotation of an engine located within the nacelle 100.

Figure 2:
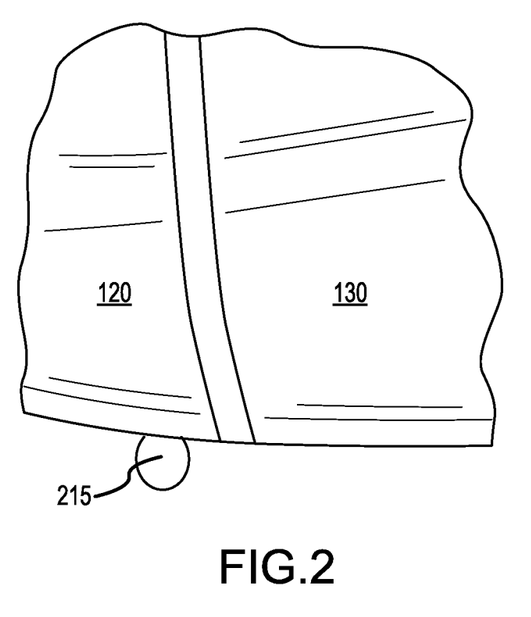
FIG. 2 illustrates a perspective view of the bottom portion of a nacelle for an aircraft with a latch handle in an open position, in accordance with various embodiments.

With reference to FIG. 2, and with continuing reference to FIG. 1, a side view of an engine nacelle with a fan cowl latch handle in the open position is provided. According to various embodiments, latch handle 215 may be included at the bottom of nacelle 100. Latch handle 215 is shown in the open position. Latch handle 215 may be visible when in the open position.

Figure 3:
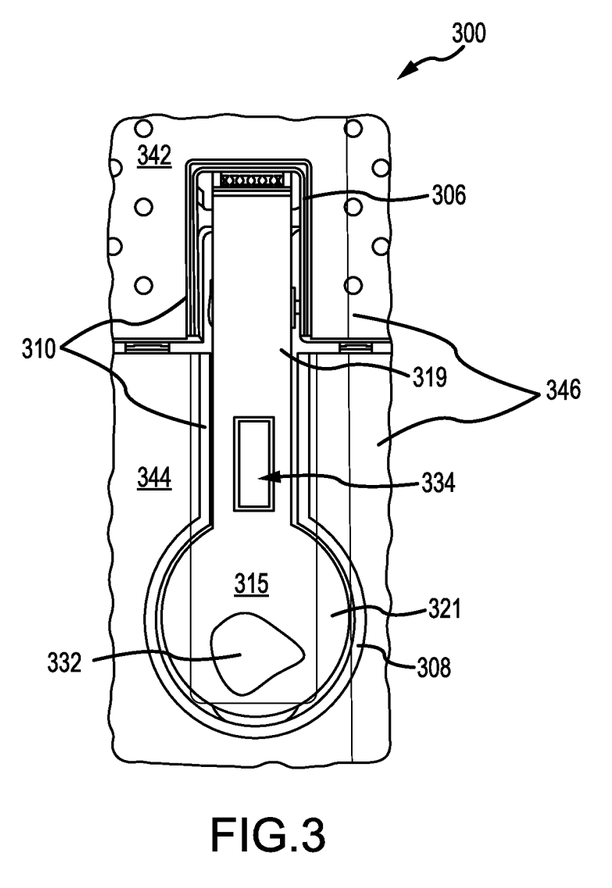
FIG. 3 illustrates an outward view of a latch handle assembly on a nacelle, in accordance with various embodiments.

Latch assemblies typically comprise a latch hook and a latch keeper, wherein the latch hook is actuated by a latch handle located on a flow surface (e.g., an outward portion of the nacelle). Accordingly, in response to the handle being operated, the latch keeper disengages from the latch hook, allowing access to the oil tank, full authority digital engine control (FADEC) box, and other fan case components. With reference to FIG. 3, an outward view of a latch handle assembly on a nacelle is provided. According to various embodiments, latch assembly 300 may include latch housing 310 and latch handle 315. Latch housing 310 may include a first half 306 and a second half 308. First half 306 of latch housing 310 may be referred to as a keeper housing. First half 306 of latch housing 310 may be attached to a first fan cowl 342 according to various embodiments. Second half 308 of latch housing 310 may be attached to a second fan cowl 344 according to various embodiments. According to various embodiments, first fan cowl 342 may comprise an outer panel which may be referred to as a first panel 346. According to various embodiments, second fan cowl 344 may comprise an outer panel which may be referred to as a first panel 346.

According to various embodiments, latch handle 315 may include first portion 319 and second portion 321. First portion 319 may comprise a high aspect ratio. Second portion 321 may comprise a high surface area portion. Aspect ratio may be defined as the ratio of an object's longer side and its shorter side. A high aspect ratio portion may be defined as an aspect ratio greater than 1. According to various embodiments, first portion 319 may have an aspect ratio greater than 1.

According to various embodiments, the second portion 321 may comprise an aspect ratio lower than that of first portion 319. In various embodiments, second portion 321 may comprise any geometry, for example, a square, circle, or other geometrical shape. Second portion 321 may have a width that is greater than the width of an adjoining portion, where width refers to the direction from forward to aft. Therefore, according to various embodiments, the width of second portion 321 may be greater than the width of first portion 319. According to various embodiments, the width of second portion 321 may be twice as wide as first portion 319.

According to various embodiments, a high surface area portion may comprise a circular or elliptical shape. The aspect ratio of a circular shape may be 1 by definition since the radius of a circle is constant. The aspect ratio of an elliptical shape may be defined as a ratio of the longest radius and the shortest radius of the ellipse.

According to various embodiments, second portion 321 may comprise any geometric shape. For example, second portion 321 may comprise a triangle or a pentagon. According to various embodiments, a high surface area portion of latch handle 315 may allow latch handle 315 to be more apparent, especially when in the open position.

According to various embodiments, latch handle 315 may include aperture 334. Aperture 334 may be disposed on latch handle 315 in order to facilitate the opening of latch handle 315. Typically, the opening of latch handle 315 from the closed position is facilitated by inserting an object into aperture 334 which may partially release latch handle 315 from latch housing 310. The latch handle 315 may then be further opened by prying latch handle 315 open.

In various embodiments, latch handle 315 may be divided into first portion 319 and second portion 321 at a point proximate aperture 334. As discussed above, first portion 319 has a width less than second portion 321, where the term width is measured in a direction from forward to aft. As illustrated, forward side is labeled 353 and aft side is labeled 350. In that regard, the width of second portion 321 is greater than the width of first portion 319.

According to various embodiments, latch handle 315 may include notification feature 332 disposed on the outward surface of second portion 321. Notification feature 332 may visually draw attention from ground crew, particularly when latch handle 315 is in the open position. According to various embodiments, notification feature 332 may comprise of one or more of letters and numbers. For example, notification feature 332 may include text or characters which may visually alert ground crew. According to various embodiments, notification feature 332 may comprise a bright paint, coating, or any other form of colored surface such that there is substantial contrast between the latch handle and the rest of the nacelle assembly. According to various embodiments, notification feature 332 may comprise a reflective surface such as a reflective tape, a reflective sticker, or any other form of reflective surface which may increase the visibility of the outward surface of second portion 321.

According to various embodiments, notification feature 332 may be circular, elliptical, square, or any other geometric shape. According to various embodiments, notification feature 332 may comprise at least a portion of the surface of the outward surface of second portion 321. For example, notification feature 332 may cover the entire outward surface of second portion 321. Furthermore, notification feature 332 may cover a portion of the outward surface of second portion 321 which is less than the entire surface area according to various embodiments. According to various embodiments, notification feature 332 may further comprise at least a portion of the surface of latch handle 315. For example, notification feature 332 may comprise the surface area of at least one or more of first portion 319 and second portion 321 of latch handle 315. According to various embodiments, the preferred configuration of notification feature 332 comprises the entire surface area of latch handle 315.

Figure 4:
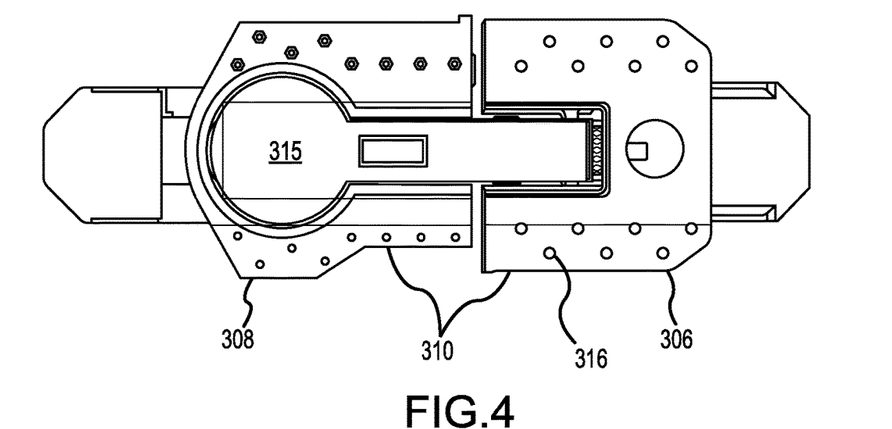
FIG. 4 illustrates an outward view of a latch handle assembly in a closed position, in accordance with various embodiments.

With reference to FIG. 4, an outward view of a latch handle assembly is illustrated. According to various embodiments, latch housing 310 may be configured to enclose at least a portion of latch handle 315 such that the outward surface of latch housing 310 and the outward surface of latch handle 315 are flush relative to each other when in the closed position. According to various embodiments, several mounting holes 316 may be disposed on latch housing 310. Mounting holes 316 may be used to mount first portion 319 and second portion 321 of latch housing 310 to at least one or more of a first fan cowling and second fan cowling.

Figure 5:
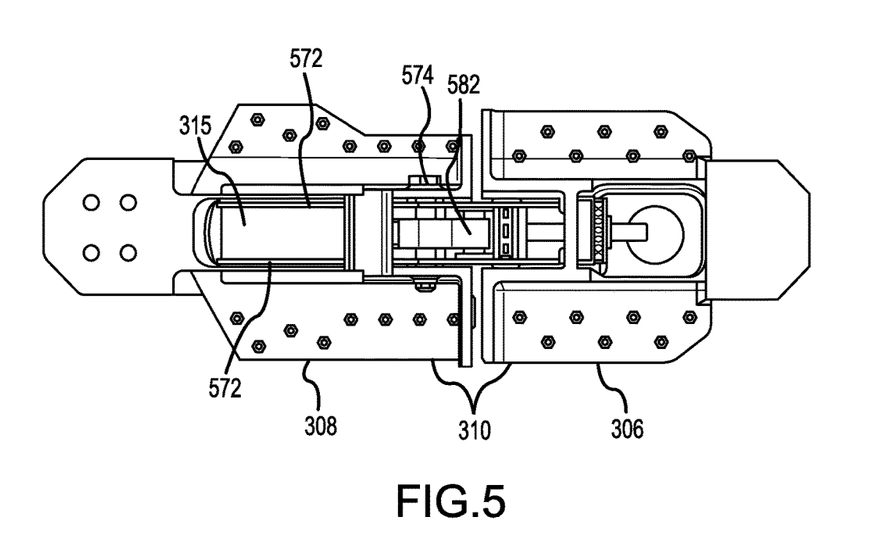
FIG. 5 illustrates an inward view of a latch handle assembly in a closed position, in accordance with various embodiments.
Figure 8:
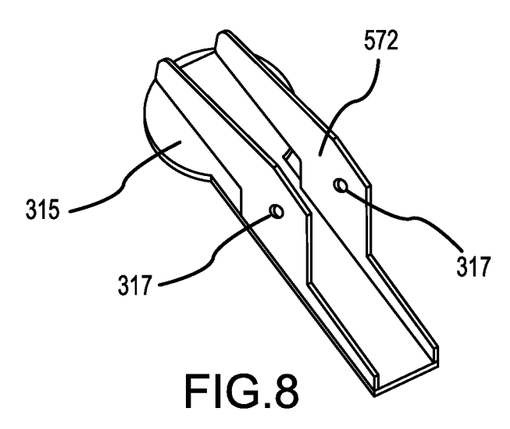
FIG. 8 illustrates an isometric view of a latch handle, in accordance with various embodiments.

With reference to FIG. 5 and FIG. 8, an inward view of a latch handle assembly and a latch handle, respectively, are illustrated. According to various embodiments, a latch keeper 582 may be configured to secure first half 306 of latch housing 310 to second half 308 of latch housing 310. As previously mentioned, in response to operation of the handle, the latch keeper may disengage from the latch hook, allowing a first fan cowling and a second fan cowling to open, giving access to the inner components of the engine and fan case.

Figure 6:
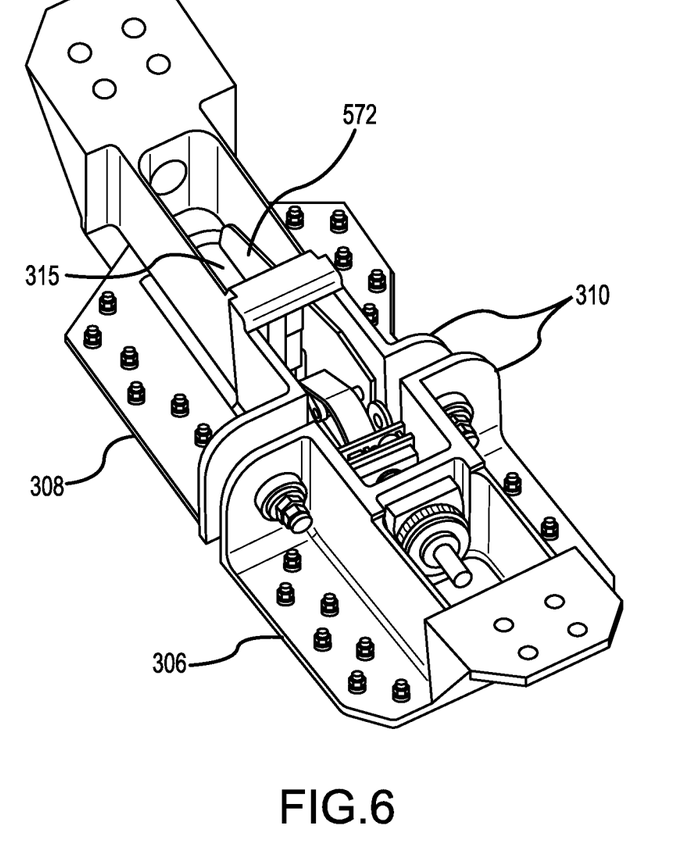
FIG. 6 illustrates an isometric view of a latch handle assembly, in accordance with various embodiments.
Figure 7:
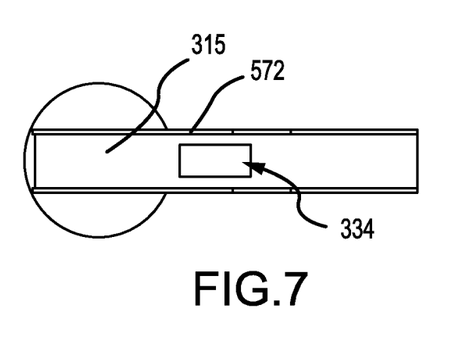
FIG. 7 illustrates an inward view of a latch handle, in accordance with various embodiments.

With reference to FIG. 6, an isometric view of a latch handle assembly is illustrated. According to various embodiments, latch handle 315 may include panels 572. Panels 572 may extend perpendicular to latch handle 315 according to various embodiments. With further reference to FIG. 5 and FIG. 7, panels 572 may include pivoting holes 317 (with momentary reference to FIG. 8). In various embodiments, panels 572 may be individually referred to as a second panel. Pivoting bolt 574 (with momentary reference to FIG. 5) may extend through a portion of latch housing 310 and into pivoting holes 317 such that latch handle 315 is configured to pivot about pivoting bolt 574 during opening and closing according to various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A latch handle comprising:
   a first portion and a second portion;
   wherein the first portion comprises an aspect ratio greater than 1;
   the second portion has a width greater than the first portion;
   wherein the latch handle is configured to actuate a latch to couple a first fan cowl to a second fan cowl; and
   the second portion pivots away from the second fan cowl in response to the latch handle moving to an open position.

2. The latch handle of claim 1, wherein a portion of the latch handle includes an aperture extending from an outward surface to an inward surface.

3. The latch handle of claim 1, further comprising a panel extending perpendicular from an inward surface of the latch handle, wherein an aperture is disposed on the panel.

4. The latch handle of claim 1, wherein the second portion includes a notification feature configured to be visible when the latch handle is in an open position.

5. The latch handle of claim 1, wherein the latch handle is a fan cowl latch handle.

6. The latch handle of claim 1, wherein the second portion is circular.

7. The latch handle of claim 1, wherein the latch handle is mounted to a latch housing, wherein the latch housing comprises a first half configured to attach to the first fan cowl and a second half configured to attach to the second fan cowl.

8. The latch handle of claim 7, wherein the latch housing includes a cutout configured to contain at least a portion of the latch handle.

9. A nacelle comprising:
   a first panel;
   a latch assembly including a latch housing and a latch handle;
   wherein the latch handle includes a first portion and a second portion;
   wherein an aperture is disposed in the first portion of the latch handle for facilitating opening of the latch handle;
   the first portion comprises an aspect ratio greater than one;
   the second portion has a width greater than the first portion;
   a cut-out is disposed on the first panel;
   the cut-out is configured to accommodate the latch assembly; and
   the width is measured in a direction of an axis of rotation of the latch handle.

10. The nacelle of claim 9, wherein the latch housing is configured to contain at least a portion of the latch handle.

11. The latch handle of claim 9, further comprising a second panel extending perpendicular from the latch handle, wherein a pivoting aperture is disposed on the second panel.

12. The nacelle of claim 11, wherein the latch handle is configured to pivot about the pivoting aperture.

13. The latch assembly of claim 9, wherein the second portion includes a notification feature configured to be visible when the latch handle is in the open position.

14. The nacelle of claim 9, wherein the latch assembly is configured to secure at least a portion of the first panel to the nacelle.

15. The nacelle of claim 14, wherein the first panel is a fan cowl panel.

16. The nacelle of claim 9, wherein the second portion is at least twice as wide as the first portion.

17. The nacelle of claim 9, wherein the first panel comprises a first fan cowl and a second fan cowl, and the latch housing comprises a first half attached to the first fan cowl and a second half attached to the second fan cowl.

* * * * *